(12) United States Patent
Button et al.

(10) Patent No.: US 8,620,125 B2
(45) Date of Patent: Dec. 31, 2013

(54) LIGHT DIFFUSING FIBERS AND METHODS FOR MAKING THE SAME

(75) Inventors: Leslie James Button, Corning, NY (US); Andrey Kobyakov, Painted Post, NY (US); Sergey Anatolyevuch Kuchinsky, St. Petersburg (RU); Stephan Lvovich Logunov, Corning, NY (US); Aramais Zakharian, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 264 days.

(21) Appl. No.: 13/097,208

(22) Filed: Apr. 29, 2011

(65) Prior Publication Data

US 2012/0275180 A1  Nov. 1, 2012

(51) Int. Cl.
*G02B 6/02* (2006.01)
*G02B 6/00* (2006.01)
*C03B 37/00* (2006.01)

(52) U.S. Cl.
USPC ........... 385/125; 385/123; 385/126; 385/127; 385/128; 385/140; 362/558; 362/582; 65/402; 65/435

(58) Field of Classification Search
USPC .............. 385/125, 140; 362/582; 65/402, 435
See application file for complete search history.

(56) References Cited

U.S. PATENT DOCUMENTS

| | | | |
|---|---|---|---|
| 5,737,472 | A | 4/1998 | Bernasson et al. |
| 6,044,191 | A | 3/2000 | Berkey et al. |
| 6,259,855 | B1 | 7/2001 | Lundin et al. |
| 7,274,847 | B2 | 9/2007 | Gowda et al. |
| 7,386,203 | B2 | 6/2008 | Maitland et al. |
| 7,609,927 | B2 | 10/2009 | Gowda et al. |
| 2003/0113082 | A1 | 6/2003 | Neuberger |
| 2005/0074216 | A1 | 4/2005 | Irie |
| 2011/0122646 | A1* | 5/2011 | Bickham et al. ............. 362/554 |

FOREIGN PATENT DOCUMENTS

| | | |
|---|---|---|
| WO | 00/79319 | 12/2000 |
| WO | 03/058309 | 7/2003 |
| WO | 2010/011299 | 1/2010 |

OTHER PUBLICATIONS

International Search Report dated Jun. 27, 2012 for counterpart application PCT/US2012/034008.
Barabanenkov et al, "Status of the Theory of Wave Propagation in Randomly-inhomogeneous Media", Soviet Physics Uspekhi, vol. 13 (2), p. 296 (1970).

(Continued)

*Primary Examiner* — Ryan Lepisto
(74) *Attorney, Agent, or Firm* — Svetlana Short

(57) ABSTRACT

Light diffusing optical fibers and methods for producing light diffusing optical fibers are disclosed. In one embodiment, a light diffusing optical fiber includes a core portion formed from silica glass and comprising a plurality of helical void randomly distributed in the core portion of the optical fiber and wrapped around the long axis of the optical fiber. A pitch of the helical voids may vary along the axial length of the light diffusing optical fiber in order to achieve the desired illumination along the length of the optical fiber. A cladding may surround the core portion. Light guided by the core portion is scattered by the helical voids radially outward, through the cladding, such that the light diffusing optical fiber emits light with a predetermined intensity over an axial length of the light diffusing optical fiber, the light diffusing optical fiber having a scattering induced attenuation loss greater than about 0.2 dB/m at a wavelength of 550 nm.

20 Claims, 7 Drawing Sheets

(56) References Cited

OTHER PUBLICATIONS

Bohren et al, "Absorption and scattering of light by small particles", Wiley 1983.

Van de Hulst et al, "Light Scattering by small particles", Wiley, 1957.
Taflove et al, "Computational electrodynamics: The finite-difference time domain method", Artech House 2000.
Spencer et al, "General ray tracing procedure", J. Opt. Soc. Am 52 (6): 672-678 (1962).

* cited by examiner

LIGHT DIFFUSING FIBERS AND METHODS FOR MAKING THE SAME

BACKGROUND

1. Field

The present specification generally relates to light diffusing optical fibers for use in illumination applications and, more specifically, to light diffusing optical fibers in which a plurality of helical voids are randomly distributed in the core portion of the fiber to increase scattering induced attenuation losses along the length of the fiber. Methods for making such fibers are also disclosed.

2. Technical Background

Bend insensitive optical fibers may be produced by introducing a random air-line ring into a glass portion of the optical fiber which allows the fiber to be bent to a small diameter without significant attenuation of an optical signal passing through the fiber. The air lines (which are actually gas-filled voids) formed in the fiber generally extend parallel to the long axis of the fiber. Such fibers are structurally similar to standard communication fibers.

Random air-line technology has also been utilized to produce light diffusing optical fibers which have a structure different than that of standard telecommunication fibers. Specifically, light diffusing optical fibers are designed such that light propagating through the fiber is scattered radially outwards along the length of the fiber thereby illuminating the fiber. Random air-line technology has been utilized in light diffusing optical fibers to promote the scattering of light. Like standard telecommunication fibers, the air lines formed in light diffusing optical fibers are generally formed such that the air lines extend parallel to the long axis of the fiber.

However, light propagating through such fibers is readily attenuated and, as a result, the intensity of the light emitted from the fiber decreases with the length of the fiber.

Accordingly, a need exists for alternative light diffusing optical fibers.

SUMMARY

According to one embodiment, a light diffusing optical fiber for use in an illumination device includes a core portion formed from silica glass and comprising a plurality of helical voids. The helical voids may be randomly distributed in the core portion and wrapped around the long axis of the fiber such that an angle between the long axis of the fiber and the plurality of helical voids is non-zero. A pitch of the helical voids may vary along the axial length of the light diffusing optical fiber in order to achieve a desired illumination distribution along the length of the fiber. A cladding surrounds and is in direct contact with the core portion, wherein light guided by the core portion is scattered by the helical voids radially outward and through the cladding such that the light diffusing optical fiber emits light with a predetermined intensity over an axial length of the light diffusing optical fiber. The light diffusing optical fiber may generally have a scattering induced attenuation loss greater than about 0.2 dB/m at a wavelength of 550 nm.

In another embodiment, a method for producing a light diffusing optical fiber includes forming an optical fiber preform comprising a preform core portion having a plurality of randomly distributed voids. The optical fiber preform is then drawn into an optical fiber such that the randomly distributed voids are drawn into elongated voids that are substantially parallel to a long axis of the optical fiber. The optical fiber is then rotated about the long axis of the optical fiber such that, after rotating, the elongated voids are helical voids wrapped around the long axis of the fiber such that an angle between the long axis and the plurality of helical voids is non-zero.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
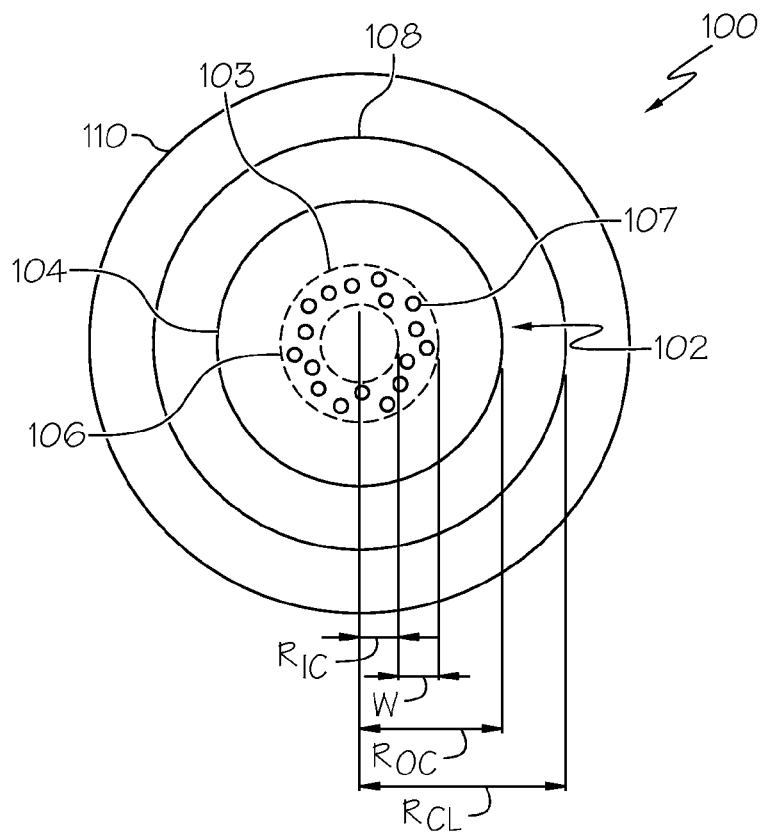
FIGS. 1A-1C schematically depict cross sections of light diffusing optical fibers having a plurality of randomly distributed helical voids in a core portion of the optical fiber, according to one or more embodiments shown and described herein.

Reference will now be made in detail to embodiments of light diffusing optical fibers, examples of which are illustrated in the accompanying drawings. Whenever possible, the same reference numerals will be used throughout the drawings to refer to the same or like parts. One embodiment of a light diffusing optical fiber is schematically depicted in FIG. 1A. The light diffusing optical fiber generally comprises a core portion in which a plurality of helical voids are randomly distributed. The helical voids are wrapped around the long axis of the fiber such that an angle between the long axis of the fiber and the plurality of helical voids is non-zero while the pitch of the helical voids varies along the axial length of the light diffusing optical fiber. The light diffusing optical fiber may additionally include a cladding which surrounds and is in direct contact with the core portion of the optical fiber. Various embodiments of light diffusing optical fibers and methods for forming light diffusing optical fibers will be described in further detail herein with specific reference to the appended drawings.

The following terminology will be used herein to describe the light diffusing optical fibers:

The term "refractive index profile," as used herein, is the relationship between the refractive index or the relative refractive index and the radius of the fiber.

The term "relative refractive index percent," as used herein, is defined as:

$$\Delta(r)\% = 100 \times [n(r)^2 - n_{REF}^2)]/2n(r)^2,$$

where n(r) is the refractive index at radius r, unless otherwise specified. The relative refractive index percent is defined at 850 nm unless otherwise specified. In one aspect, the reference index $n_{REF}$ is silica glass with the refractive index of 1.452498 at 850 nm. In another aspect, $n_{REF}$ is the maximum refractive index of the cladding at 850 nm. As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "updopant," as used herein, refers to a dopant which raises the refractive index of glass relative to pure undoped $SiO_2$. The term "downdopant," as used herein, is a dopant which has a propensity to lower the refractive index of glass relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

The term "α-profile" or "alpha profile," as used herein, refers to a relative refractive index profile, expressed in terms of $\Delta(r)$ which is in units of "%", where r is the radius and which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the α-profile, $r_f$ is the final point of the α-profile, and α is an exponent which is a real number.

The term "parabolic," as used herein, includes substantially parabolically shaped refractive index profiles which may vary slightly from an α value of 2.0 at one or more points in the core, as well as profiles with minor variations and/or a centerline dip. In some exemplary embodiments, α is greater than 1.5 and less than 2.5, more preferably greater than 1.7 and 2.3 and even more preferably between 1.8 and 2.3, as measured at 850 nm. In other embodiments, one or more segments of the refractive index profile have a substantially step index shape with an α value greater than 8, more preferably greater than 10 even more preferably greater than 20, as measured at 850 nm.

The term "nano-structured," as used herein, describes a region or area of the fiber with a large number (e.g., greater than 50) of voids in the cross-section of the fiber.

Referring now to FIG. 1A, one embodiment of a light diffusing optical fiber 100 is schematically depicted. The light diffusing optical fiber 100 generally includes a core portion 102, with a nano-structured ring 106, and a cladding 108. In the embodiment shown in FIG. 1A, the core portion 102 is formed from silica-based glass and has an index or refraction n. The core portion 102 extends from the center line of the light diffusing optical fiber 100 to a radius $R_{OC}$. In the embodiments described herein the radius $R_{OC}$ of the core portion 102 may be such that 10 μm≤$R_{OC}$≤600 μm. For example, in some embodiment the radius $R_{OC}$ may be such that 30 μm≤$R_{OC}$≤400 μm. In other embodiments, the radius $R_{OC}$ may be such that 125 μm≤$R_{OC}$≤300 μm. In still other embodiments, the radius $R_{OC}$ may be such that 50 μm≤$R_{OC}$≤250 μm.

In some embodiments, the core portion 102 of the light diffusing optical fiber 100 is a graded-index core such that the refractive index profile of the core has a parabolic (or substantially parabolic) shape. For example, in some embodiments, the refractive index profile of the core portion 102 has an α-shape with an α value of about 2, preferably between 1.8 and 2.3, as measured at 850 nm. In other embodiments, one or more segments of the refractive index profile of the core portion 102 have a step index shape with an a value greater than 8, more preferably greater than 10, and, even more preferably, greater than 20 as measured at 850 nm. In some embodiments, the refractive index of the core portion may have a centerline dip, wherein the maximum refractive index of the core, and the maximum refractive index of the entire optical fiber, is located a small distance away from long axis 105 of the light diffusing optical fiber 100. However, in other embodiments the refractive index of the core portion 102 has no centerline dip, and the maximum refractive index of the core portion 102, and the maximum refractive index of the entire light diffusing optical fiber is located at the centerline.

The nano-structured ring 106 of the core portion is formed from silica-based glass and generally includes a plurality of randomly distributed helical voids. The width W of the nano-structured ring 106 is preferably 0.05$R_{OC}$≤W2≤0.9$R_{OC}$, preferably 0.1$R_{OC}$≤W≤0.9$R_{OC}$, and in some embodiments 0.5$R_{OC}$≤W≤0.9$R_{OC}$. The radial width W of nano-structured ring 106 is preferably greater than 1 μm. For example, W may be 5 μm to 300 μm, preferably 200 μm or less. In some embodiments, W is greater than 2 μm and less than 100 μm. In other embodiments, W is greater than 2 μm and less than 50 μm. In other embodiments, W is greater than 2 μm and less than 20 μm. In some embodiments, W is at least 7 μm. In other embodiments, W is greater than 2 μm and less than 12 μm.

The helical voids 107 are utilized to scatter light propagating in the core portion 102 of the light diffusing optical fiber 100 such that the light is directed radially outward from the core portion 102, thereby illuminating the light diffusing optical fiber and the space surrounding the light diffusing optical fiber. The helical voids 107 extend around the long axis of the fiber in a circumferential direction such that the helical voids 107 are rotated or wrapped around the long axis of the fiber. Whereas increasing the width of the nano-structured ring 106 increases the scattering-induced attenuation for the same density of nano-sized structures, it has now been found that the scattering-induced attenuation may also be increased by varying the pitch of the helical voids over the length of the fiber. Specifically, it has been found that helical voids with a smaller pitch scatter more light than helical voids with a larger pitch. Accordingly, the intensity of the illumination of the fiber along its axial length can be controlled (i.e., predetermined) by varying the pitch of the helical voids along the axial length. The pitch of the helical voids 107, as used herein, refers to the inverse of the number times the helical voids are wrapped or rotated around the long axis of the fiber per unit length. For example, if a helical void 107 has 5 turns per meter of axial length of the fiber, the pitch of the helical void is 0.2 meters.

Figure 2:
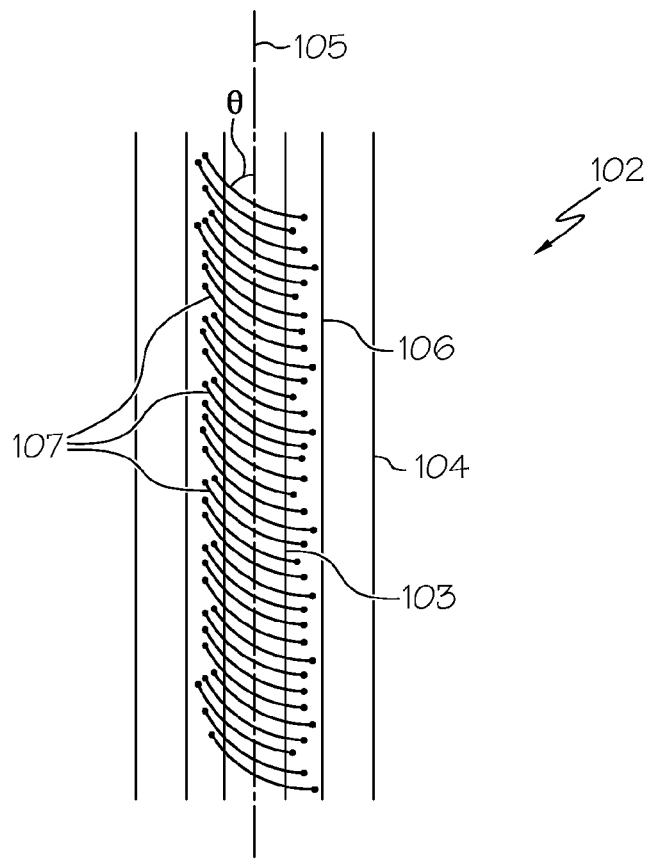
FIG. 2 schematically depicts a length of the core portion of a light diffusing optical fiber of FIG. 1A showing the helical voids wrapped around the long axis of the optical fiber.

Referring to FIGS. 1A and 2, a portion of an axial length of the core portion 102 of the optical fiber 100 is schematically depicted. As shown in FIG. 2, the helical voids 107 are rotated or wrapped around the long axis 105 of the fiber such that an angle θ between the long axis of the fiber and the helical voids is non-zero. The angle θ between the helical voids and the long axis of the fiber may be calculated according to the following equation:

$$\theta = 0.00036 * R(\mu m)/P(m),$$

where R is the radial position of the helical void (i.e., how far the helical void is from the center of the fiber) and P is the pitch of the helical void. For example, if P=0.10 meters and R=100 microns, then θ=0.36 degrees.

In some embodiments described herein, the pitch of the helical voids 107 is generally 0.20 m or less, preferably less than or equal to 0.20 m and greater than or equal to 0.01 m.

In some embodiments, the pitch of the helical voids may decrease with increasing length from an input end of the light diffusing optical fiber to an output end of the light diffusing optical fiber to compensate for the attenuation of light propagating through the core of the fiber. Accordingly, by decreasing the pitch of the helical voids from an input end to an output end of the light diffusing optical fiber, it is possible to produce a light diffusing optical fiber which may be uniformly illuminated with a predetermined intensity along its entire length with very little variation in the intensity of the light emitted from the fiber.

However, in other embodiments, the pitch of the helical voids may be varied between discrete axial regions of the fiber in order to produce a desired lighting effect. For example, the pitch of the helical voids may be decreased over a first axial length, increased or made uniform over a second axial length adjacent to the first, and decreased over a third axial length adjacent to the second. In this example, the first and third axial lengths may be uniformly illuminated while the second axial length may have a variation in the intensity of the illumination over the axial length.

The helical voids 107 contained in the nano-structured ring 106 generally have a maximum diameter greater than or equal to about 50 nm and less than or equal to about 1 μm, preferably less than or equal to about 200 nm. In the embodiments described herein, the helical voids generally have a length from about 1 millimeter to about 50 meters as measured in the axial direction of the fiber. In some embodiments, it is preferred that the length of the helical voids be less than 10 meters, preferably less than 5 meters, and, more preferably less than 2 meters.

The helical voids 107 are voids in the sense that they do not contain glass. However, in embodiments described herein, the voids may be filled with a gas which is introduced into the voids during formation of the optical fiber preform from which the fiber is drawn. For example, the helical voids 107 may be filled with $SO_2$, Kr, Ar, $CO_2$, $N_2$, $O_2$, or mixtures thereof. Alternatively, the helical voids 107 may be substantially devoid of any gas, such as when the voids contain a vacuum. However, regardless of the presence or absence of any gas, the average refractive index $n_2$ of the nano-structured ring 106 is lowered relative to silica glass due to the presence of helical voids 107.

In the embodiments described herein, the nano-structured ring 106 may be located at different positions in the core portion 102 in order to achieve the desired increase in scattering-induced attenuation losses. Referring to the embodiment of the optical fiber 100 depicted in FIG. 1A, the nano-structured ring 106 is positioned within the core portion 102. Specifically, in this embodiment, the core portion 102 includes an inner core portion 103 and an outer core portion 104 which are separated by the nano-structured ring 106 which includes a plurality of randomly distributed helical voids 107. The nano-structured ring 106 surrounds the inner core portion 103 and is in direct contact with both the inner core portion 103 and the outer core portion 104. The inner core portion 103 may be formed from silica-based glass and have an index of refraction $n_1$. The outer core portion 104 may also be formed from silica-based glass and have an index of refraction $n_3$. In general, the index of refraction $n_1$ of the inner core portion 103 and the index of refraction $n_3$ of the outer core portion 104 are greater than the index of refraction $n_2$ of the nano-structured ring 106.

In the embodiment of the optical fiber 100 depicted in FIG. 1A, the inner core portion 103 has a radius $R_{IC}$ in the range $0.1R_{OC} \leq R_{IC} \leq 0.9R_{OC}$, preferably $0.5R_{OC} < R_{IC} 0.9R_{OC}$. In one exemplary embodiment, the inner core portion has a radius $R_{IC}$ less than 30 μm and the core portion 102 has a radius greater than or equal to 45 μm and less than or equal to about 62.5 μm for a fiber having a 125 μm diameter core.

Still referring to FIG. 1A, the light diffusing optical fiber 100 may further comprise a cladding 108 which surrounds and is in direct contact with the core portion 102. The cladding 108 may be formed from a material which has a low refractive index in order to increase the numerical aperture (NA) of the light diffusing optical fiber 100. For example, the numerical aperture of the fiber may be greater than about 0.3, more preferably greater than about 0.4. In one embodiment, the cladding 108 may be formed from a low index polymeric material such as UV or thermally curable fluoroacrylate or silicone. In other embodiments the cladding 108 may be formed from silica glass which is down-doped with a down-dopant, such as, for example, fluorine. The cladding 108 generally has an index of refraction $n_4$ which is less than the index of refraction of the core portion 102, and, more specifically, less than the index of refraction $n_1$ of the inner core portion 103 and the index of refraction $n_3$ of the outer core portion 104. In some embodiments, the index of refraction $n_4$ of the cladding 108 may be less than the index of refraction $n_3$ of the nano-structured ring 106. In one particular embodiment, the cladding 108 is a low index polymer cladding with a relative refractive index that is negative relative to silica glass. For example, the relative refractive index of the cladding may be less than about −0.5% and even more preferably less than −1%.

The cladding 108 generally extends from the outer radius $R_{OC}$ of the core portion 102 to a radius $R_{CL}$. In some embodiments described herein, the radial width of the cladding (i.e., $R_{OC}-R_{CL}$) is greater than about 10 μm, preferably greater than about 20 μm, more preferably greater than about 50 μm and, most preferably, greater than about 70 μm.

Figure 3:
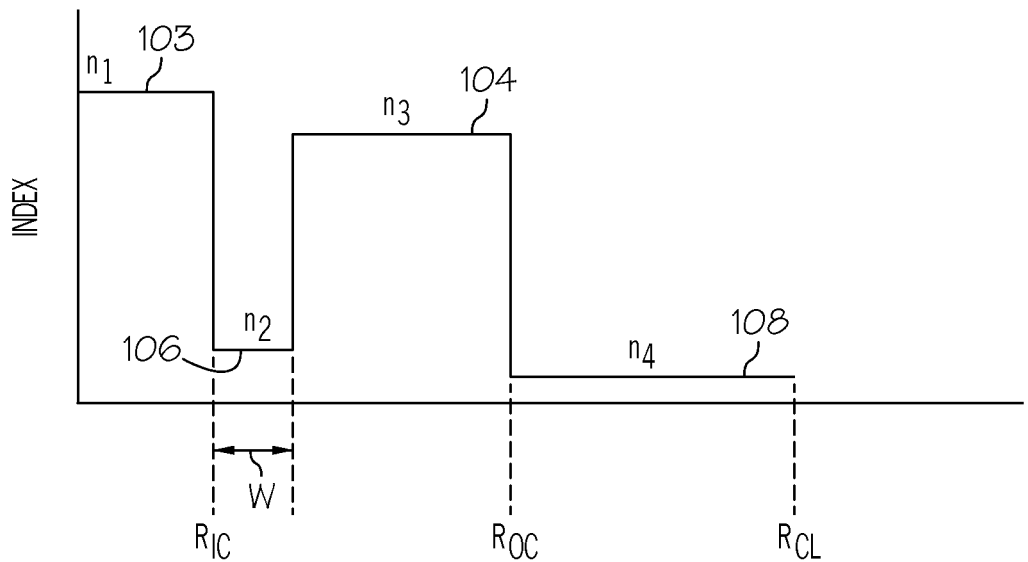
FIG. 3 is a refractive index profile of the light diffusing optical fiber of FIG. 1A.

Referring to FIGS. 1A and 3, FIG. 3 graphically depicts a refractive index profile of the light diffusing optical fiber 100 of FIG. 1A. As shown in FIG. 3, the index of refraction $n_1$ of the inner core portion 103 and the index of refraction $n_3$ of the outer core portion 104 are greater than the index of refraction $n_2$ of the nano-structured ring 106. For example, in the embodiment shown in FIG. 1, the inner core portion 103 and the outer core portion 104 may be formed from silica-based glass which includes dopants, such as Ge, Al, P or similar updopants, such that the index of refraction $n_1$ of the inner core portion 103 and the index of refraction $n_3$ of the outer core portion 104 are greater than the index of refraction of un-doped silica glass of the nano-structured ring 106. Moreover, in this example, the relative amounts and/or types of dopants used in the inner core portion 103 and the outer core portion 104 may be different such that $n_1 > n_3$, as depicted in the refractive index profile shown in FIG. 3. Further, the nano-structured ring 106 may be formed with down-doped silica glass such that the index of refraction $n_2$ of the nano-structured ring is significantly less than the indices of refraction of either the inner core portion 103 or the outer core portion 104. In this exemplary refractive index profile $n_1 > n_3 > n_2 > n_4$. However, it should be understood that other profiles may be possible, so long as the inner core portion and the outer core portion have indices of refraction greater than the nano-structured ring and the index of refraction of the cladding is less than the index of refraction of the core portion so as to facilitate a light diffusing optical fiber with a high numerical aperture.

For example, while inner core portion 103, the outer core portion 104 and the nano-structured ring 106 have been described herein as comprising dopants, it should be understood that one or more of these portions may be formed without dopants so long as $n_1$ and $n_3$ are greater than $n_2$. For example, in one embodiment, the inner core portion 103 and the outer core portion 104 may be formed without dopants while the nano-structured ring 106 is down-doped. Alternatively, the inner core portion 103 and the outer core portion 104 may be up-doped while the nano-structured ring 106 is formed without dopants.

Figure 5:
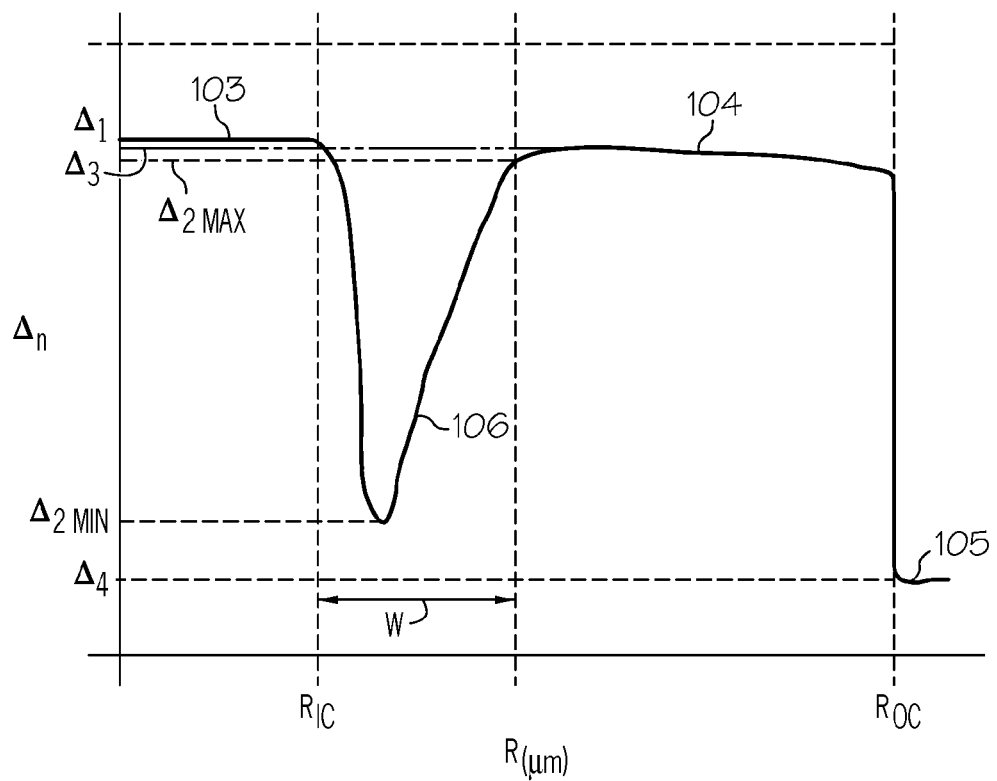
FIG. 5 schematically depicts the relative refractive index profile of the light diffusing optical fiber of FIG. 1A.

Referring now to FIGS. 1A, 3 and 5, an exemplary relative refractive index profile for the core portion and cladding portion of the light diffusing optical fiber 100 shown in FIG. 1A is graphically depicted. The reference index $n_{REF}$ is the refractive index of the cladding 108. In this embodiment, the inner core portion 103 has a relative refractive index profile 41 corresponding to a maximum refractive index $n_1$ which, in this embodiment, is constant. The nano-structured ring 106 has minimum refractive index $n_2$, a relative refractive index profile $\Delta 2(r)$, a maximum relative refractive index $\Delta 2_{MAX}$, and a minimum relative refractive index $\Delta 2_{MIN}$. The outer core portion 104 has a relative refractive index profile $\Delta 3(r)$ with a maximum relative refractive index $\Delta 3_{MAX}$ corresponding to a maximum refractive index $n_3$ which, in this embodiment, is constant. In this embodiment the cladding 108 has a relative refractive index profile $\Delta 4(r)$ corresponding to a refractive index $n_4$ which, in this embodiment, is constant. In this embodiment the refractive indices of the regions have the following relationship $n_1 > n_3 > n_2 > n_4$.

Referring again to FIG. 1A, the light diffusing optical fiber 100 may optionally include a coating layer 110 which surrounds and is in direct contact with the cladding 108. For example, in one embodiment, the coating layer 110 comprises a low modulus primary coating layer and a high modulus secondary coating layer which surrounds the low modulus primary coating layer. In some embodiments, the coating layer 110 comprises a polymer coating such as an acrylate-based or silicone based polymer. In at least some embodiments, the coating layer 110 has a constant diameter along the length of the light diffusing optical fiber.

In some embodiments, the coating layer 110 may be utilized to enhance the distribution and/or the nature of the light emitted radially from the core portion 102 and passed through the cladding 108. For example, in some embodiments, the coating layer 110 may include a scattering material on the outer-most surface of the coating layer 110. The scattering material may contain $TiO_2$-based white ink which provides for an angular distribution of light scattered from the core portion 102 of the light diffusing optical fiber 100. For example, in some embodiments, the ink layer may have a thickness of about 1 µm to about 5 µm. In other embodiments, the thickness of the ink layer and/or the concentration of the pigment in the ink layer may be varied along the axial length of the fiber so as to provide more uniform variation in the intensity of light scattered from the light diffusing optical fiber 100 at large angles (i.e., angles greater than about 15 degrees).

Alternatively or additionally, the coating layer 110 may contain a fluorescent material that converts light scattered from the core portion 102 to a longer wavelength of light. In some embodiments, white light can be emitted from the light diffusing optical fiber by coupling the light diffusing optical fiber 100 with such a fluorescent material in the coating layer 110 to a UV light source such as, for example, a 405 nm or 445 nm diode laser. The UV light from the light source that is scattered from the core portion 102 fluoresces the material in the coating layer such that white light is emitted from the light diffusing optical fiber 100.

Figure 1B:
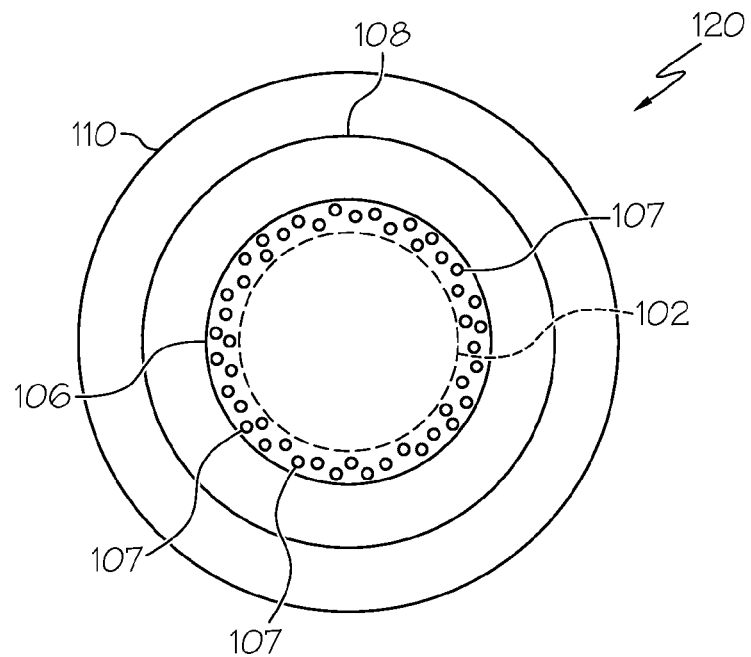
Figure 4:
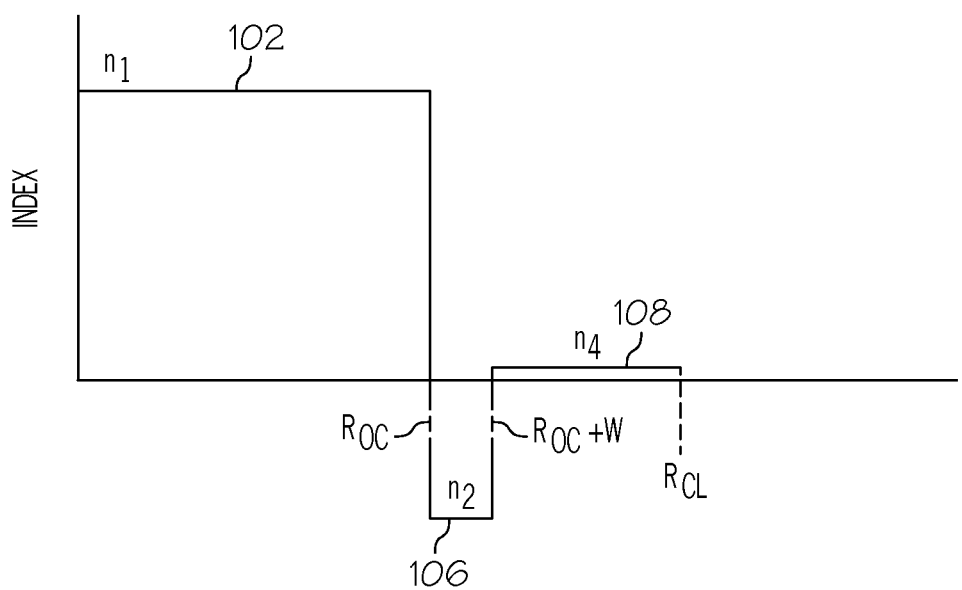
FIG. 4 is a refractive index profile of the light diffusing optical fiber of FIG. 1B.

Referring now to FIGS. 1B and 4, in another embodiment, the light diffusing optical fiber 120 includes a core portion 102 with a nano-structured ring 106, a cladding 108, and a coating layer 110, as described above. However, in this embodiment, the nano-structured ring 106 is the outermost region of the core portion 102 such that the cladding 108 surrounds and is in direct contact with the nano-structured ring 106. The nano-structured ring 106 includes a plurality of randomly distributed helical voids 107 which are wrapped about the long axis of the fiber, as described hereinabove. Moreover, in this embodiment, the core portion 102 may have a step refractive index profile, as described hereinabove, or, alternatively, a graded refractive index profile, with an α-value of, for example, greater than or equal to about 1.8 and less than or equal to about 2.3. In this embodiment, the refractive index $n_1$ of the core portion 102 is generally greater than the refractive index $n_4$ of the cladding 108 which, in turn, has a refractive index greater than the nano-structured ring 106 such that $n_1 > n_4 > n_2$, as depicted in FIG. 4.

Figure 1C:
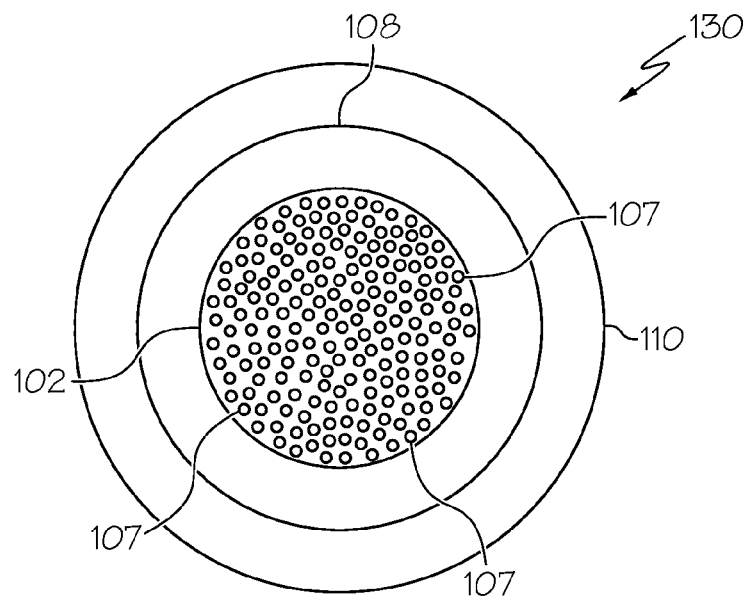

Referring now to FIG. 1C, in another embodiment, the light diffusing optical fiber 130, includes a core portion 102, a cladding 108 and a coating layer 110, as described hereinabove with respect to FIGS. 1A and 1B. However, in this embodiment, the entirety of the core portion 102 contains randomly distributed helical voids 107 such that the entire core portion 102 is nano-structured. In this embodiment, the core portion 102 may have a step refractive index profile, as described hereinabove, or, alternatively, a graded refractive index profile, with an α-value of, for example, greater than or equal to about 1.8 and less than or equal to about 2.3.

The light diffusing optical fibers described herein may be single-moded or multi-moded at the wavelengths of interest. In embodiments where the optical fibers are multi-moded, the light diffusing optical fibers may have a numerical aperture NA of 0.3 or more for wavelengths in the range from about 350 nm to about 1600 nm.

Figure 6:
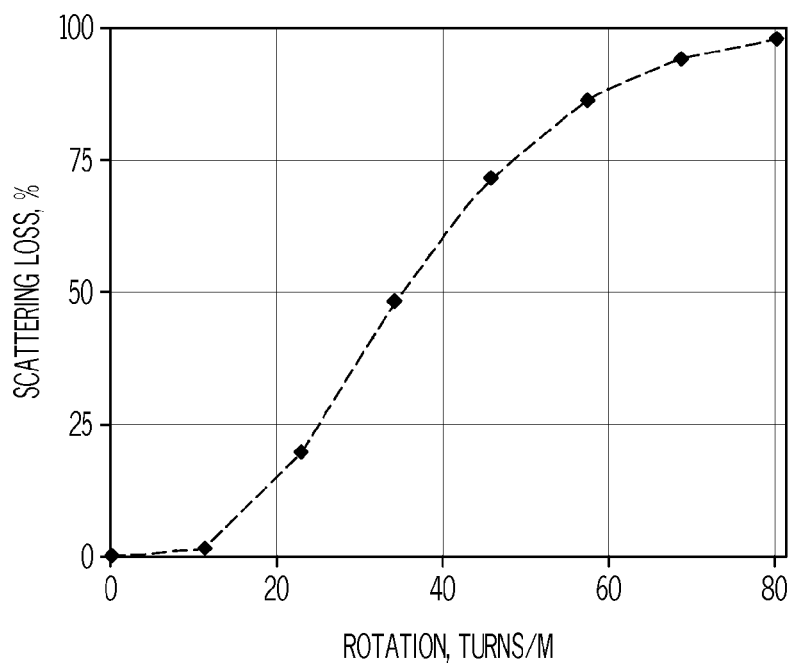
FIG. 6 graphically depicts the modeled scattering loss of a fiber as a function of the rotation of helical voids formed in or adjacent to the core portion of the fiber.

As briefly discussed above, it has now been determined that the scattering induced attenuation losses of the light diffusing optical fibers may be increased due to the formation of helical voids 107 either in the core portion 102 or directly adjacent to the core portion 102. Moreover, it has also been determined that scattering induced attenuation losses within the fiber increase as the rate of rotation of the helical voids is increased. For example, referring to FIG. 6, the scattering losses of a modeled optical fiber are shown as a function of the rate of rotation of the helical voids (i.e., the inverse of the pitch). The scattering losses are defined as 100×(the light energy coupled into the fiber)/(the light energy emitted at an output end of the fiber). As shown in FIG. 6, as the number of turns per meter increases (i.e., the tighter the helical voids are "wrapped" around the long axis of the fiber) the greater the scattering losses which, in turn, increases the brightness of the light diffusing optical fiber.

Figure 7:
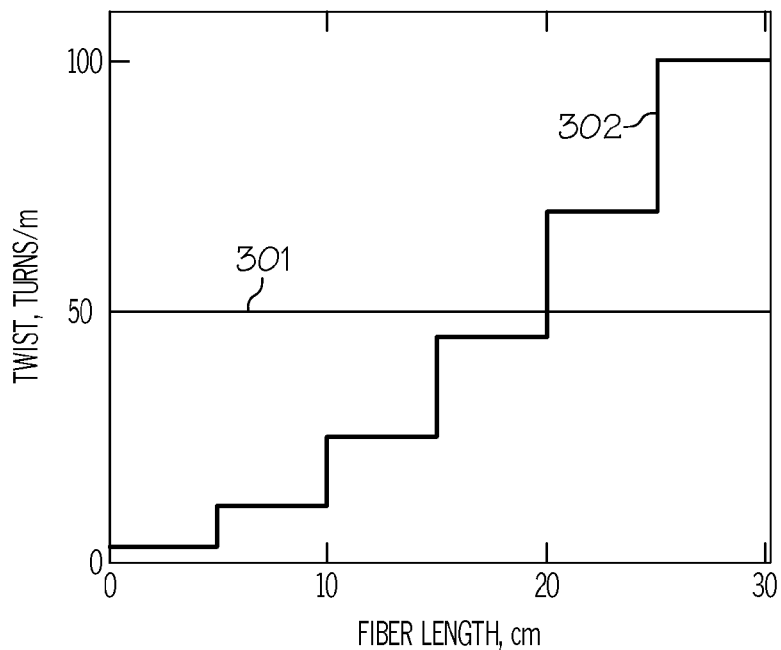
FIG. 7 graphically depicts the rotation of two modeled fibers as a function of the fiber length.

Moreover, it has also been found that, while helical voids with a constant pitch locally increase the scattering induced attenuation losses of the fiber, helical voids which decrease in pitch over the length of the fiber may increase the scattering induced attenuation losses of the fiber. For example, referring to FIG. 7, two fibers comprising helical voids in the core portion as depicted in FIG. 1A were mathematically modeled. The rotation rate of the helical voids in each fiber is graphically depicted as a function of the fiber length. Specifically, curve 301 graphically depicts the rotation rate of the first modeled fiber having helical voids with a constant rotation rate while curve 302 depicts the rotation rate of the second modeled fiber having helical voids with a rotation rate which increases along the axial length of the fiber in a step-wise manner. The brightness of each fiber was also modeled as a function of the length of the fiber, as depicted in FIG. 8.

Figure 8:
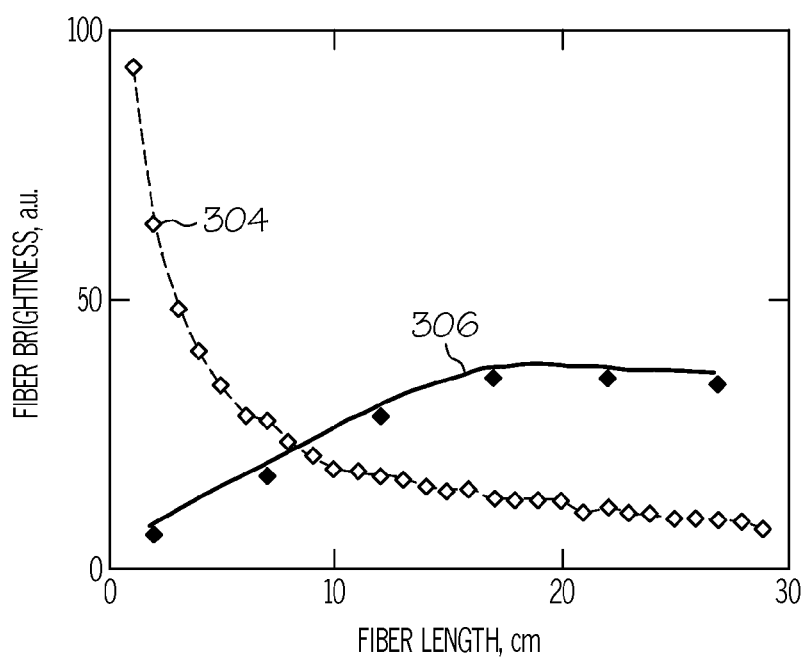
FIG. 8 graphically depicts the brightness of the modeled fibers of FIG. 7 as a function of the fiber length.

Specifically referring to FIG. 8, curve 304 depicts the brightness of the first modeled fiber having helical voids with a constant rotation rate. As shown in FIG. 8, the brightness of the fiber steadily decreases over the axial length of the fiber in a similar manner as a fiber formed with elongated voids rather than helical voids. However, curve 306 shows that the brightness of the fiber actually increases with the axial length of the fiber when the fiber is formed such that the rotational rate of the helical voids increases with the length of the fiber. As such, it is believed that the amount of light scattered from the fiber is dependent on the variation in pitch of the helical voids formed in the light diffusing optical fiber and, as such, the scattering losses along the length of the fiber may be controlled or even specifically tailored to achieve a desired illumination profile along the length of the fiber by varying the pitch of the helical voids between the input end of the optical fiber and the output end of the optical fiber, as described hereinabove.

In the embodiments described herein the light diffusing optical fibers will generally have a length of less than about 100 meters, preferably less than about 75 meters, more preferably less than about 50 meters. In one embodiment, the pitch of the helical voids formed in the optical fibers decreases along the entire axial length of the axial fiber to compensate for attenuation of the optical signal in the fiber. For example, the pitch of the helical voids near the input end of the fiber may be about 0.20 m and uniformly decreases over the axial length of the fiber in order to produce uniform illumination over the axial length of the fiber. In one embodiment, the minimum pitch of the helical voids proximate the output end of the fiber may be about 0.01 m. In still other embodiments the pitch of the helical voids may be varied between 0.20 m and 0.01 m within discrete axial lengths of the optical fiber to obtain a desired illumination effect.

Further, the light diffusing optical fibers described herein have a scattering induced attenuation loss of greater than about 0.2 dB/m at a wavelength of 550 nm. For example, in some embodiments, the scattering induced attenuation loss may be greater than about 0.5 dB/m, preferably greater than about 1 dB/m, more preferably greater than about 4 dB/m.

As described herein, the light diffusing fiber can be constructed to produce uniform illumination along the entire length of the fiber or uniform illumination along a segment of the fiber which is less than the entire length of the fiber. The phrase "uniform illumination," as used herein, means that the intensity of light emitted from the light diffusing fiber does not vary by more than 25% over the specified length.

The fibers described herein may be formed utilizing various techniques. For example, the light diffusing optical fiber 100 can be made by methods which utilize preform consolidation conditions which result in a significant amount of gas being trapped in the consolidated glass preform thereby forming voids in the preform. Rather than taking steps to remove these voids, the resultant preform is used to form an optical fiber with helical voids. Methods for forming an optical fiber preform with voids are described in, for example, U.S. patent application Ser. No. 11/583,098, which is incorporated herein by reference.

For example, to form embodiments of the light diffusing optical fibers described herein, soot may be deposited onto a fully consolidated core cane having the desired index profile via outside vapor deposition (OVD) thereby forming a consolidated, void-free silica core region surrounded by a porous silica soot region. The soot cladding of this preform is then sintered under conditions suitable for producing a consolidated soot overclad region surrounding a consolidated, void-free silica core. For example, in one embodiment, the optical fiber preform may be first dried for 2 hours in an atmosphere comprising helium and 3 percent chlorine (all percent gases by volume) at 1100° C. in the upper-zone of a furnace. Following drying, the optical fiber preform is down driven through a hot zone of the furnace at approximately 1500° C. in a 100 percent $SO_2$ (by volume) sintering atmosphere. The down drive rate is sufficient to produce a 100° C./min temperature increase at the outside of the soot cladding during the downdrive process. Thereafter, the optical fiber preform maybe then down driven a second time at a rate suitable to produce an approximately 50° C./min temperature increase for the outside of the soot cladding during the downdrive process. The optical fiber preform assembly may then be down driven a third time through the hot zone of the furnace at a rate sufficient to produce an approximately 25° C./min temperature increase for the outside of the soot cladding during the downdrive process. The optical fiber preform may then be down driven again a fourth time through the hot zone at a rate sufficient to produce an approximately 12.5° C./min temperature increase for the outside of the soot cladding during the downdrive process. Thereafter, the optical fiber preform may be sintered at a rate of approximately 3° C./min to sinter the soot into an $SO_2$-seeded silica overclad preform. Following each downdrive step, the optical fiber preform may be updriven at 200 mm/min into the upper-zone part of the furnace which was held at a temperature of 1100° C. The first series of higher downfeed rates are employed to glaze the outside of the optical fiber preform, which facilitates trapping the consolidation gases (e.g., $SO_2$) in the preform. The preform is then placed for 24 hours in an argon-purged holding oven set at 1000° C. to outgas any remaining helium in the preform. This preform is then redrawn in an argon atmosphere on a conventional graphite redraw furnace set at approximately 1700° C. to form an optical fiber preform having a void-free $SiO_2$ core, with an $SO_2$-seeded (i.e., containing random voids containing $SO_2$ gas) silica overclad, wherein the void containing region is located around the outer perimeter of the core portion of the preform, similar to the optical fiber depicted in FIG. 1B.

To form an optical fiber preform suitable for forming the optical fiber depicted in FIG. 1A, an optical fiber preform with a void-free $SiO_2$ core and an $SO_2$-seeded silica overclad may be first formed, as described above. Thereafter, additional $SiO_2$ soot may be deposited over the overclad portion of the optical fiber preform via OVD. The soot of this cladding (which may be called overcladding) may then be sintered by first drying the optical fiber preform in an atmosphere consisting of helium and 3 percent chlorine at 1100° C. for 2 hours. Thereafter, the optical fiber preform may be down driven a hot zone set at 1500° C. in a 100% helium (by volume) atmosphere in order to sinter the soot to produce an optical fiber preform having a void-free silica core, silica $SO_2$-seeded ring (i.e. silica with voids containing $SO_2$), and a void-free overclad. The preform may then be placed in an argon purged holding oven set at 1000° C. for 24 hours to outgas any remaining helium from the preform.

Light diffusing fibers having the structure depicted in FIG. 1C can be constructed utilizing similar techniques. For example, instead of depositing the soot on a solid core cane, the soot may be deposited on a thinner bait rod. Following consolidation of the soot on the bait rod, the bait rod is withdrawn from the assembly and the preform is redrawn to collapse the narrow hole left by the bait rod.

After the optical fiber preforms with the void-containing regions are formed, the preforms may be drawn into optical fibers with elongated voids. In one embodiment, the fiber may be rotated as it is drawn from the preform in order to rotate or wrap the elongated voids about the long axis of the fiber thereby shaping the elongated voids into helical voids. For example, referring now to FIG. 9, one embodiment of a system 200 for drawing optical fiber 100 from an optical fiber preform is schematically depicted. The system 200 generally comprises a draw furnace 214, a fiber cooling system 222, a coating system 230, and a fiber take up system 240. The optical fiber 100 is drawn from the optical fiber preform and through the various stages of the system 200 with the fiber take-up system 240. The fiber take-up system 240 utilizes various drawing mechanisms 242 and pulleys 241 to provide the necessary tension to the optical fiber 100 as the optical fiber 100 is drawn through the system 200. The drawing mechanisms 242 and pulleys 241 of the fiber take-up system 240 may be utilized to impart rotation to the optical fiber 100 as the optical fiber is drawn through the system 200 and thereby rotate the elongated voids around the long axis of the fiber such that the elongated voids, which are initially linear and parallel to the long axis, are formed into helical voids that wrap around the long axis of the optical fiber 100.

For example, the fiber take-up system 240 may include an assembly for imparting rotation to the optical fiber 100 as the optical fiber is drawn from the preform. An assembly suitable for imparting rotation to the optical fiber is disclosed in U.S. Pat. No. 6,876,804. However, it should be understood that other systems suitable for imparting rotational motion to the optical fiber may also be incorporated into the fiber take-up system 240 and utilized to rotate the fiber. For example, in one embodiment (not shown) the optical fiber preform may be rotated as the optical fiber is drawn from the preform. In the embodiment shown in FIG. 9 take-up controller 260 electrically coupled to the fiber take-up system 240 controls both the tension applied to the optical fiber and the amount and direction of the rotation applied to the optical fiber 100.

Figure 9:
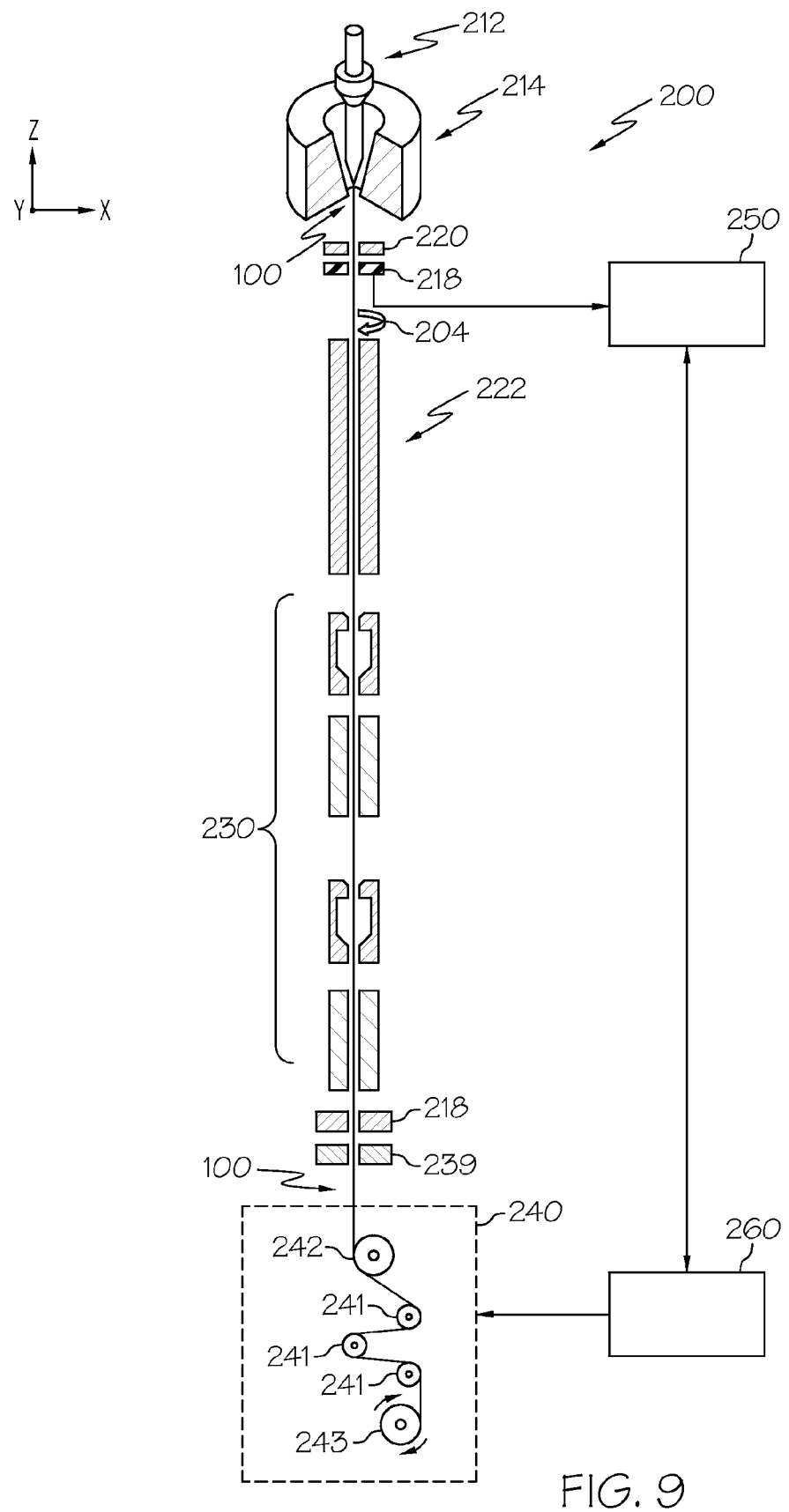
FIG. 9 schematically depicts a fiber drawing system for forming a light diffusing optical fiber having helical voids.

In the embodiment of the system 200 depicted in FIG. 9, the optical fiber 100 is drawn from the optical fiber preform with the fiber take-up system 240 and exits the draw furnace 214 along a substantially vertical pathway (i.e., a pathway along the z-direction). Simultaneously, the fiber take-up system 240 rotates the optical fiber 100 such that the elongated voids are rotated into helical voids about the long axis of the fiber.

As the optical fiber 100 exits the draw furnace 214, a non-contact flaw detector 220 is used to examine the optical fiber 100 for damage and/or flaws that may have occurred during the manufacture of the optical fiber 100. Thereafter, the diameter of the optical fiber 100 may be measured with non-contact sensor 218.

As the optical fiber is drawn along the vertical pathway, the optical fiber 100 may optionally be drawn through a cooling system 222 which cools the optical fiber 100 prior to one or more coatings being applied to the optical fiber 100.

Still referring to FIG. 9, after the optical fiber 100 exits the cooling system 222, the optical fiber 100 enters a coating system 230 where one or more polymer layers (i.e., the polymeric cladding material and/or the coating layer) are applied to the optical fiber 100. As the optical fiber 100 exits the coating system 230, the diameter of the optical fiber 100 may be measured with non-contact sensor 218. Thereafter, a non-contact flaw detector 239 is used to examine the optical fiber 100 for damage and/or flaws in the coating that may have occurred during the manufacture of the optical fiber 100.

While the helical voids have been described herein as being formed in the optical fiber 100 as the optical fiber is drawn from the optical fiber preform, it should be understood that other embodiments are possible. For example, in an alternative embodiment, the helical voids may be created in the optical fiber after the optical fiber has been drawn and coated. Specifically, a finished optical fiber may be drawn from a storage spool and rotated, utilizing techniques similar to that described above, in order to form the elongated voids into helical voids having the desired pitch along the length of the fiber. In this embodiment, because the helical voids are formed after the fiber has been cooled, the pitch of the voids may be adjusted (or altogether removed) by reversing the rotation process. Accordingly, in this embodiment, it should be understood that the illumination pattern along the length of the fiber may be adjusted when the helical voids are formed after the fiber has cooled.

EXAMPLES

The invention will be further understood by reference to the following examples.

Three 1 meter samples of light diffusing optical fiber were prepared from an optical fiber having a relative refractive index profile similar to that shown in FIG. 5. The fiber had a 125 µm glass core, a low index polymer cladding having a radial thickness of 20 µm, and a secondary coating having a 60 µm radial thickness. Comparative sample 1 was measured in its "as formed" condition (i.e., without the formation of helical voids). Sample 2 was formed with helical voids having a pitch of 0.20 m and sample 3 was formed with helical voids having a pitch of 0.1 m. A range of wavelengths from about 400 nm to about 1200 nm were coupled into the input end of each fiber and the intensity of the light coupled through to the output end was measured over the range of wavelengths. The light source was a white light tungsten lamp-based fiber source. Detection of the light coupled through the fiber was measured with a spectrum analyzer with a −80 dBm noise floor. The scattering losses over the length of each fiber were calculated based on the difference in the input intensity and the output intensity of the various wavelengths of light coupled into the samples. The scattering losses in decibels are graphically illustrated in FIG. 10 as a function of the wavelength.

Figure 10:
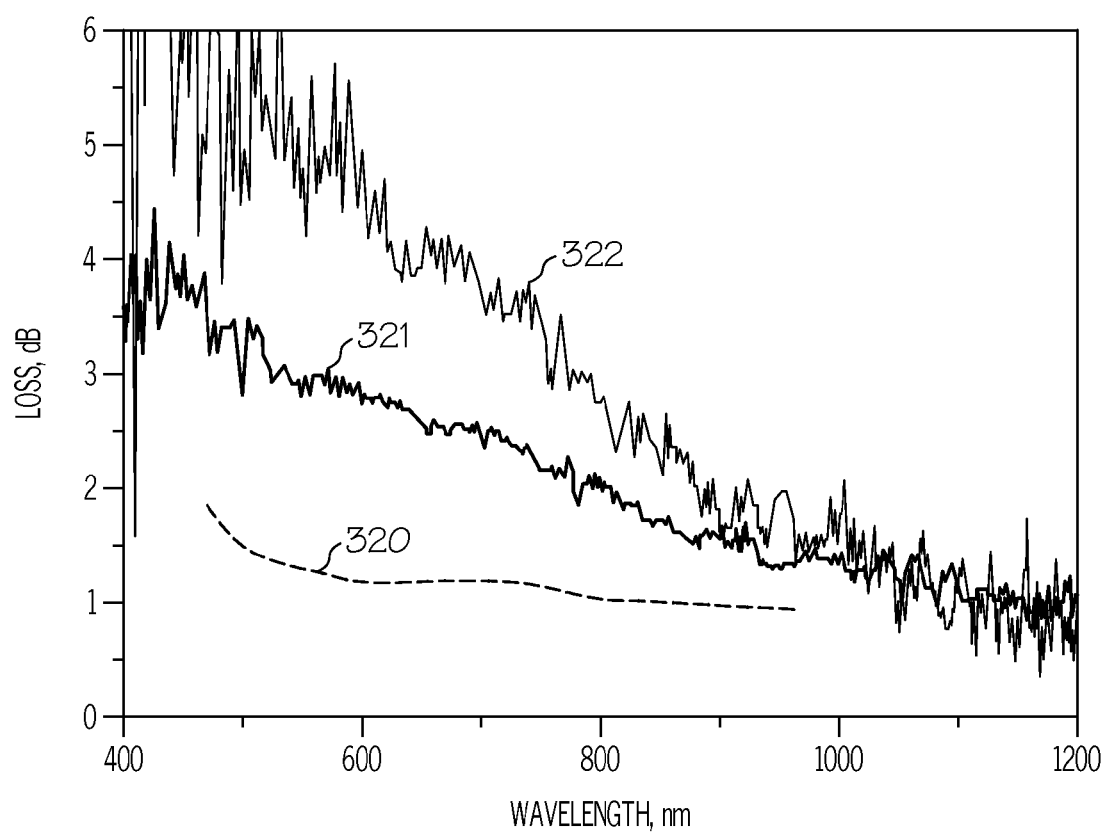
FIG. 10 graphically depicts the scattering losses of a comparative light diffusing optical fiber and two exemplary light diffusing optical fibers having helical voids with different pitches.

Referring now to FIG. 10, curve 320 shows the scattering loss of comparative sample 1 while curves 321 and 322 shows the scattering losses of exemplary samples 2 and 3, respectively. The curve 320 shows the background scattering of the comparative sample 1 formed without helical voids. Curves 321 and 322 show the losses due to the helical voids and do not include background scattering. As shown in FIG. 10, the fibers formed with helical voids exhibited considerably more scattering than the fiber formed without helical voids. Specifically, curve 320 shows that the scattering losses of comparative sample 1 were approximately 1 dB/m at 550 nm. However, curve 321 shows that the scattering losses increase to approximately 5 dB/m at 550 nm when the fiber is formed with helical voids having a pitch of 0.2 m while curve 322 shows that the scattering losses increase to 10 dB/m at 550 nm when the pitch of the helical voids is further decreased to 0.01 m.

Based on the foregoing, it should now be understood that the scattering induced attenuation losses along an axial length of a light diffusing optical fiber can be increased by forming the light diffusing optical fiber with helical voids in the core portion of the light diffusing optical fiber. Specifically, the scattering induced attenuation losses of the light diffusing optical fiber may be increased by decreasing the pitch of the helical voids formed in the core portion of the fiber. Moreover, the scattering induced attenuation losses of the optical fiber may be specifically tailored to produce a desired illumination pattern by varying the pitch of the helical voids within or between discrete segments of the light diffusing optical fiber.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A light diffusing optical fiber for use in an illumination device, the light diffusing optical fiber comprising:
a core portion formed from silica-based glass and comprising helical voids randomly distributed in the core portion and wrapped around a long axis of the light diffusing optical fiber such that an angle between the long axis and the helical voids is non-zero, a pitch of the helical voids varying along an axial length of the light diffusing optical fiber; and
a cladding surrounding and in direct contact with the core portion, wherein light guided by the core portion is scattered by the helical voids radially outward and through the cladding such that the light diffusing optical fiber emits light with a predetermined intensity over the axial length of the light diffusing optical fiber, the light diffusing optical fiber having a scattering induced attenuation loss greater than about 0.2 dB/m at a wavelength of 550 nm.

2. The light diffusing optical fiber of claim 1, wherein the scattering induced attenuation loss is greater than about 0.5 dB/m at a wavelength of 550 nm.

3. The light diffusing optical fiber of claim 1, wherein the helical voids are formed in a nano-structured ring centered on the long axis of the light diffusing optical fiber and surrounding an inner core portion comprising solid glass, the nano-structured ring having a radial thickness of at least 2 µm.

4. The light diffusing optical fiber of claim 3, wherein the inner core portion has an index of refraction $n_1$ and the nano-structured ring has an index of refraction $n_2$ such that $n_1 > n_2$.

5. The light diffusing optical fiber of claim 3, wherein the cladding is in direct contact with the nano-structured ring.

6. The light diffusing optical fiber of claim 3, wherein the nano-structured ring is surrounded by an outer core portion comprising solid glass.

7. The light diffusing optical fiber of claim 6, wherein the inner core portion has an index of refraction $n_1$, the nano-structured ring has an index of refraction $n_2$ and the outer core portion has an index of refraction $n_3$ such that $n_1$ and $n_3$ are greater than $n_2$.

8. The light diffusing optical fiber of claim 1, wherein the helical voids have a diameter less than or equal to about 1 µm.

9. The light diffusing optical fiber of claim 1, wherein the axial length of the light diffusing optical fiber is less than about 100 meters.

10. The light diffusing optical fiber of claim 1, wherein the core portion of the light diffusing optical fiber has a radius greater than or equal to 10 µm and less than or equal to 600 µm.

11. The light diffusing optical fiber of claim 1, wherein the cladding has a radial thickness of at least 10 µm.

12. The light diffusing optical fiber of claim 1, wherein the light diffusing optical fiber is a multimode fiber having a numerical aperture greater than or equal to about 0.3.

13. The light diffusing optical fiber of claim 1, further comprising at least one coating layer surrounding and in direct contact with the cladding.

14. A method for producing a light diffusing optical fiber, the method comprising:
forming an optical fiber preform comprising a preform core portion having randomly distributed voids;
drawing the optical fiber preform into an optical fiber such that the randomly distributed voids are drawn into elongated voids that are substantially parallel to a long axis of the optical fiber;
rotating the optical fiber about the long axis of the optical fiber such that, after rotating, the elongated voids are helical voids wrapped around the long axis of the light diffusing optical fiber such that an angle between the long axis and the helical voids is non-zero.

15. The method of claim 14, wherein the optical fiber is rotated about the long axis of the optical fiber while the optical fiber is molten.

16. The method of claim 14, further comprising coating the optical fiber with at least one coating layer before the optical fiber is rotated about the long axis of the optical fiber.

17. The method of claim 14, wherein the optical fiber preform further comprises a preform cladding portion surrounding and in direct contact with the preform core portion.

18. A light diffusing optical fiber for use in an illumination device, the light diffusing optical fiber comprising:
a core portion formed from silica-based glass and comprising helical voids randomly distributed in the core portion and wrapped around a long axis of the light diffusing optical fiber such that an angle between the long axis and the helical voids is non-zero, a pitch of the helical voids varying along an axial length of the light diffusing optical fiber; and
a cladding surrounding and in direct contact with the core portion, wherein light guided by the core portion is scattered by the helical voids radially outward and through the cladding such that the light diffusing optical fiber emits light with a predetermined intensity over the axial length of the light diffusing optical fiber, the light diffusing optical fiber having a scattering induced attenuation loss greater than about 0.2 dB/m at a wavelength of 550 nm, wherein the pitch of the helical voids is less than 0.20 m.

19. A light diffusing optical fiber for use in an illumination device, the light diffusing optical fiber comprising:

a core portion formed from silica-based glass and comprising helical voids randomly distributed in the core portion and wrapped around a long axis of the light diffusing optical fiber such that an angle between the long axis and the helical voids is non-zero, a pitch of the helical voids varying along an axial length of the light diffusing optical fiber; and a cladding surrounding and in direct contact with the core portion, wherein light guided by the core portion is scattered by the helical voids radially outward and through the cladding such that the light diffusing optical fiber emits light with a predetermined intensity over the axial length of the light diffusing optical fiber, the light diffusing optical fiber having a scattering induced attenuation loss greater than about 0.2 dB/m at a wavelength of 550 nm, wherein the pitch of the helical voids is less than or equal to 0.20 m and greater than or equal to 0.01 m.

20. A light diffusing optical fiber for use in an illumination device, the light diffusing optical fiber comprising:

a core portion formed from silica-based glass and comprising helical voids randomly distributed in the core portion and wrapped around a long axis of the light diffusing optical fiber such that an angle between the long axis and the helical voids is non-zero, a pitch of the helical voids varying along an axial length of the light diffusing optical fiber; and a cladding surrounding and in direct contact with the core portion, wherein light guided by the core portion is scattered by the helical voids radially outward and through the cladding such that the light diffusing optical fiber emits light with a predetermined intensity over the axial length of the light diffusing optical fiber, the light diffusing optical fiber having a scattering induced attenuation loss greater than about 0.2 dB/m at a wavelength of 550 nm, wherein the pitch of the helical voids increases from an input end of the light diffusing optical fiber to an output end of the light diffusing optical fiber.

* * * * *